United States Patent [19]

Schneider et al.

[11] Patent Number: 5,688,859

[45] Date of Patent: Nov. 18, 1997

[54] AQUEOUS BINDERS AND THEIR USE IN AQUEOUS COATING COMPOSITIONS

[75] Inventors: Volker Schneider; Harald Blum, both of Wachtendonk; Armin Sickert, Krefeld, all of Germany

[73] Assignee: Bayer Aktiengesellschaft, Leverkusen, Germany

[21] Appl. No.: 586,051

[22] Filed: Jan. 16, 1996

[30] Foreign Application Priority Data

Jan. 24, 1995 [DE] Germany ............... 195 02 084.7

[51] Int. Cl.$^6$ ............ C08J 3/00; C08K 3/20; C08L 75/00; C08G 63/48
[52] U.S. Cl. ............ 524/591; 524/539; 524/839; 524/840; 525/7; 525/7.1; 525/7.4; 525/54.44; 525/123; 525/124; 525/131; 525/167.5; 525/330.5; 525/440; 525/454; 525/455
[58] Field of Search ............... 524/539, 591, 524/839, 840; 525/7, 7.1, 7.4, 54.44, 123, 124, 131, 167.5, 330.5, 440, 454, 455

[56] References Cited

U.S. PATENT DOCUMENTS

| | | | |
|---|---|---|---|
| 3,844,993 | 10/1974 | Miller | 260/22 TN |
| 3,919,145 | 11/1975 | Eckhoff | 260/22 TN |
| 4,720,522 | 1/1988 | Schmidt et al. | 525/43 |
| 5,004,779 | 4/1991 | Blum et al. | 524/591 |
| 5,331,039 | 7/1994 | Blum et al. | 524/840 |
| 5,391,620 | 2/1995 | Bederke et al. | 525/123 |

FOREIGN PATENT DOCUMENTS

| | | |
|---|---|---|
| 3428204 | 2/1986 | Germany. |
| 2076840 | 12/1981 | United Kingdom. |
| 2112793 | 7/1983 | United Kingdom. |

*Primary Examiner*—Patrick Niland
*Attorney, Agent, or Firm*—Joseph C. Gil; Thomas W. Roy

[57] ABSTRACT

The present invention relates to a process for preparing aqueous binders for aqueous coating compositions by reacting a mixture of A) 9.9 to 85 wt. % of a hydroxy- and acid-functional poly(meth)acrylate and B) 14.9 to 90 wt. % of a hydroxy-functional, fatty acid-modified polyester with C) 0.1 to 20 wt. % of a diisocyanate having a molecular weight of 140 to 318, to form urethane groups and then dissolving or dispersing the reaction product in water with prior or simultaneous neutralization of at least a portion of the carboxyl groups present, wherein the sum of the percentages of A) to C) add up to 100. The present invention also relates to the aqueous binders obtained by this process and their use, optionally combined with other oxidatively drying lacquer resins, in air- and/or heat-drying, two-component coating compositions, preferably aqueous polyurethane coating compositions, or in combination with optionally blocked polyisocyanates and/or amino cross-linking agents in aqueous heat-curing coating compositions.

14 Claims, No Drawings

AQUEOUS BINDERS AND THEIR USE IN AQUEOUS COATING COMPOSITIONS

BACKGROUND OF THE INVENTION

1. Field of the Invention

The present invention relates to a new process for producing aqueous binders, in particular for air-drying coating compositions, based on water-dilutable, hydroxy-functional polyacrylates and non-water-dilutable, fatty acid-modified polyesters which are linked to each other via urethane groups, the aqueous binders obtained by this process and their use in coating compositions.

2. Description of the Prior Art

The replacement of organic solvents in air-drying lacquers and coating compositions by water has been of interest to lacquer raw material manufacturers for a long time.

DE-OS 3,428,204 describes aqueous emulsions of air-drying lacquer binders based on fatty acid-modified, polyethylene glycol-containing alkyd resins which are acidified with trimellitic anhydride and fatty acid-modified alkyd resins. In this case the two alkyd resins are linked to each other by means of partial esterification or by diisocyanates. As is well known, storage stability problems can occur with this type of acidified polyester binder, especially when the pH is alkaline.

EP-A-0,379,007 describes oxidatively drying alkyd resins which are rendered hydrophilic by reaction with diisocyanates and hydroxy-carboxylic acids. This type of binder is storage stable and has excellent properties except for a relatively slow drying period due to the relatively low molecular weight of the binder resin.

U.S. Pat. No. 4,720,522 describes acrylic-modified alkyd resins as binders for water-dilutable, air-drying lacquers. Acrylic-modified alkyd resins exhibit only moderate oxidative drying due to the reduced reactivity of the unsaturated fatty acids as a result of radically initiated copolymerization and, thus, the lacquer film is not very durable.

Combinations of urethane-modified alkyd resins in emulsified form with polyvinyl or polyacrylic latices are also known (U.S. Pat. No. 3,919,145). Only moderate film qualities can be achieved, however, due to the inert, non-cross-linkable latex fraction in these binder emulsions.

DE-PS 3,219,471 describes aqueous alkyd emulsions in which special, polyethylene glycol-containing, acrylic-modified alkyd resins are used as an emulsifier for urethane-modified alkyd resins. The process described for producing the binder dispersion is complicated and, in addition, there is a risk of non-hydrophilic binder fractions separating out when using external emulsifiers.

An object of the present invention is to provide storage-stable, aqueous, oxidatively drying binders which are suitable for producing fast drying, high quality coatings and which contain only small amounts of organic co-solvents.

This object can be achieved by the process according to the invention described in more detail below. This process is based on the surprising discovery that the at least partial linkage of branched, hydroxy-functional polyesters to high-molecular weight hydroxy-functional poly(meth)acrylates before dispersing this lacquer binder in water does not lead to gel formation, as would be expected, but rather enables the production of stable aqueous binder dispersions which fully satisfy the quality requirements mentioned above.

SUMMARY OF THE INVENTION

The present invention relates to a process for preparing aqueous binders for aqueous coating compositions by reacting a mixture of A) 9.9 to 85 wt. % of a hydroxy- and acid-functional poly(meth)acrylate and B) 14.9 to 90 wt. % of a hydroxy-functional, fatty acid-modified polyester with C) 0.1 to 20 wt. % of a diisocyanate having a molecular weight of 140 to 318, to form urethane groups and then dissolving or dispersing the reaction product in water with prior or simultaneous neutralization of at least a portion of the carboxyl groups present, wherein the sum of the percentages of A) to C) add up to 100.

The present invention also relates to the aqueous binders obtained by this process and their use, optionally combined with other oxidatively drying lacquer resins, in air- and/or heat-drying, two-component coating compositions, preferably aqueous polyurethane coating compositions, or in combination with optionally blocked polyisocyanates and/or amino cross-linking agents in aqueous heat-curing coating compositions.

DETAILED DESCRIPTION OF THE INVENTION

The urethane-modified resins prepared by reacting components A) and B) with diisocyanate component C) generally have a weight average molecular weight ($M_w$, which may be determined by gel permeation chromatography using polystyrene as the standard) of 1100 to 70,000, preferably 1600 to 45,000 and an acid number (based on all of the carboxyl groups) of 10 to 100, preferably 14 to 60 mg KOH/g. 25 to 100%, preferably 40 to 100%, of the carboxyl groups are in the form of carboxylate groups.

The urethane-modified resins are produced as an aqueous solution or as a dispersion, depending upon the molecular weight of the resin, the concentration of carboxyl and carboxylate groups, the type of neutralizing agent used and the presence of optionally incorporated auxiliary solvents. Generally, both dissolved and dispersed fractions are present.

The term "(meth)acrylate" acrylate and/or methacrylate. Accordingly, "(meth)acrylic acid" means acrylic acid and/or methacrylic acid.

In the process according to the invention, preferably 15 to 80, more preferably 25 to 80 wt. % of component A) is mixed with 19 to 80, more preferably 25 to 75 wt. % of component B) and reacted with 0.1 to 15, more preferably 0.5 to 10 wt. % of component C).

Component A) is selected from acid-functional poly(meth)acrylates prepared from

A1) 1 to 99, preferably 1 to 50 and more preferably 1.5 to 25 wt. % of one or more α,β-unsaturated mono and/or dicarboxylic acids having 3 to 16 carbon atoms, A2) 0.1 to 30, preferably 0.1 to 20 and more preferably 0.5 to 10 wt. % of one or more hydroxyalkyl esters of (meth)acrylic acid wherein the hydroxyalkyl groups have 2 to 12 carbon atoms and optionally contain ether groups, A3) 0 to 98, preferably 15 to 98 and more preferably 30 to 95 wt. % of one or more (cyclo)alkyl esters of (meth)acrylic acid having 1 to 20 carbon atoms in the (cyclo)alkyl group and A4) 0 to 80, preferably 0 to 65 and more preferably 0 to 50 wt. % of one or more copolymerizable compounds other than A1) to A3), wherein the sum of the percentages of A1) to A4) add up to 100.

The hydroxy and acid-functional poly(meth)acrylate is prepared in known manner by the radical initiated polymerization of monomers A1) to A4) in the presence of 5 to 40, preferably 5 to 20 wt. % of solvents which are inert towards isocyanates such as methoxypropyl acetate, xylene, toluene, butyl acetate, solvent naphtha, dimethyl diglycol, dimethylpropylene glycol, dimethyldipropylene glycol, diisobutyl ketone, N-methyl-pyrrolidone and mixtures of these and other solvents.

Monomers A1) are selected from acids having at least one carboxyl group per molecule such as acrylic acid, methacrylic acid, ethylacrylic acid, bisoxyethyl esters and mixtures thereof. Acrylic acid and/or methacrylic acid are preferably used as component A1).

Monomers A2) are selected from copolymerizable, ethylenically unsaturated monomers having at least one hydroxyl group per molecule. Suitable monomers include hydroxyalkylesters of acrylic acid, methacrylic acid or another α,β-ethylenically unsaturated carboxylic acid. These esters may be obtained by esterifying a polyalkylene glycol having up to 12 carbon atoms with the acid or by reacting the acid with an alkylene oxide. Examples include a polyethylene glycol mono(meth)acrylate having up to 12 carbon atoms in the polyethylene glycol group. Component A2) is preferably a hydroxyalkyl ester of acrylic acid and/or methacrylic acid, such as 2-hydroxyethyl acrylate, the isomer mixture of hydroxypropyl (meth)acrylates obtained by the addition of one mole of propylene oxide to one mole of acrylic acid or methacrylic acid, 2-hydroxypropyl acrylate, 3-hydroxypropyl acrylate, 2-hydroxypropyl methacrylate, 3-hydroxypropyl methacrylate, 4-hydroxybutyl acrylate and 4-hydroxybutyl methacrylate. The corresponding esters of other unsaturated acids, such as ethacrylic acid, crotonic acid and similar acids having up to about 6 carbon atoms per molecule may also be used. Hydroxyalkyl esters of the acids mentioned having 2 to 6 carbon atoms in the hydroxyalkyl group are particularly preferred.

Monomers a3) are selected from copolymerizable (cyclo) alkyl esters of (meth)acrylic acid having 1 to 20 carbon atoms in the (cyclo)alkyl group. Alkyl(meth)acrylates having 1 to 18 carbon atoms in the alkyl group are particularly suitable, such as methyl, ethyl, n-propyl, n-butyl, n-hexyl, 2-ethylhexyl, n-stearyl and n-lauryl (meth)acrylate. Also suitable are cycloaliphatic (meth)acrylates such as cyclohexyl (meth)acrylate.

Any monoethylenically or polyethylenically, unsaturated compounds or mixtures of such compounds which are copolymerizable with, but not the same as monomers A1), A2) and A3), may be used as monomers A4). Examples include styrene, α-methylstyrene, vinyltoluene, vinylpyrrolidone, vinyl ethers, vinyl esters, divinylbenzene and di(meth)-acrylates of diols such as ethanediol, 1,3-propanediol and 1,4-butanediol. Any mixtures of monomers A1) to A4) may also be used.

When preparing polyacrylate component A), the following procedure may be used: Components A1) to A4) are added, partially mixed or separately, to a suitable solvent, such as methoxypropyl acetate, and polymerized in the presence of at least one polymerization initiator. To produce particular properties, one or several of the monomers may be added more rapidly, or more slowly, starting earlier or later and/or finishing earlier or later than the other monomers.

Suitable polymerization initiators are known and include free radical forming peroxides such as benzoyl peroxide, tert.-butyl perbenzoate, tert.-butyl per-2-ethylhexanoate and ditert.-butyl peroxide; azo initiators such as azobisisobutyronitrile; and mixtures thereof.

Polymerization is performed at temperatures of 60° to 180° C., preferably 100° to 160° C., depending upon the initiator used.

To produce the desired molecular weight, regulators (such as dodecyl mercaptan or mercaptoethanol) may be incorporated in amounts of 0.01 to 6%.

The type and amounts of the starting materials and the reaction conditions during preparation of copolymers A) are selected such that copolymers A) have a weight average molecular weight ($M_w$, determined by gel permeation chromatography using polystyrene as the standard), of 1000 to 50,000, preferably 1500 to 25,000; an acid number of 7 to 560, preferably 7 to 390 and more preferably 11 to 195 mg KOH/g; and a hydroxyl number of 0.5 to 145, preferably 0.5 to 97 and more preferably 2.5 to 48 mg KOH/g.

Polyester component B) is prepared by the reaction of

B1) 15 to 90, preferably 25 to 75 and more preferably 35 to 65 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 7 to 60, preferably 10 to 40 and more preferably 13 to 30 wt. % of a polycarboxylic acid component containing one or more di-, tri- or tetracarboxylic acids having a molecular weight of 98 to 840 and/or their anhydrides, B3) 10 to 60, preferably 15 to 45 and more preferably 20 to 40 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

Suitable monocarboxylic acids B1) include benzoic acid, tert.-butylbenzoic acid, hexahydrobenzoic acid, saturated fatty acids (such as 2-ethylhexanoic acid or coconut oil acid) and unsaturated fatty acids (such as soybean oil acid, tung oil acid, safflower oil acid, castor acid, dehydrated castor acid, arachidic acid, tall oil acid and conjugated diene fatty acids).

Suitable di-, tri- and/or tetracarboxylic acids B2) having a molecular weight of 98 to 840 or their anhydrides include phthalic acid (anhydride), isophthalic acid, terephthalic acid, tetrahydrophthalic acid (anhydride), hexahydrophthalic acid (anhydride), succinic acid (anhydride), maleic acid (anhydride), fumaric acid, adipic acid, sebacic acid, azelaic acid, dimeric fatty acids, trimeric fatty acids, trimellitic acid (anhydride), pyromellitic acid (anhydride), butanetetracarboxylic acid and mixtures thereof.

Suitable polyols B3) include di-, tri- and/or tetraols such as ethylene glycol, 1,2- and 1,3-propylene glycol, 1,3-, 1,4-, 2,3-butanediol, 1,6-hexanediol, 2,5-hexanediol, trimethylhexanediol, diethylene glycol, triethylene glycol, hydrated bisphenols, 1,4-cyclohexanediol, 1,4-cyclohexanedimethanol, trimethylolpropane, glycerine, pentaerythritol, trimethylpentanediol, dipentaerythritol and mixtures thereof.

Compounds B4) include monoalcohols having a molecular weight of 100 to 290 such as n-hexanol, cyclohexanol, decanol, dodecanol, tetradecanol, octanol, octadecanol, natural fatty alcohol mixtures such as Ocenol 110/130 (available from Henkel) and mixtures thereof and/or hydroxycarboxylic acids or their cyclic esters such as lactic acid, dimethylolpropionic acid and ε-caprolactone.

Polyester polyols B) are prepared by in known manner by the esterification of components B1) to B4), optionally in the presence of known esterification catalysts, preferably by melt condensation or azeotropic condensation at temperatures of 180° to 240° C. The type and amounts of components B1) to B4) and the reaction conditions are selected such that polyesters B) have a hydroxyl number of 8 to 300, preferably 100 to 190 mg KOH/g; an acid number of at most 15, preferably at most 8 and more preferably at most 4 mg KOH/g; and a weight average molecular weight ($M_w$, determined by gel permeation chromatography using polystyrene as the standard) of 500 to 8000, preferably 1000 to 5000.

Component C) is selected from organic diisocyanates having a molecular weight of 140 to 318. Examples include 1,4-butane diisocyanate, hexamethylene diisocyanate, 1-isocyanato-3,3,5-trimethyl-5-iscyanatomethylcyclohexane (isophorone diisocyanate or IPDI), 4,4'-diisocyanatodicylohexylmethane, 4,4'-diisocyanatodiphenylmethane, toluylene-2,4 diisocyanate, toluylene-2,6 diisocyanate, 2,4,4-trimethyl-hexamethylene-1,6 diisocyanate, naphthylene diisocyanate and other diisocyanates such as those described in "Methoden der organische Chemie" (Houben-Weyl, vol. 14/2, 4th ed., Georg Thieme Verlag, Stuttgart 1963, p. 61–70).

The reaction between components A), B) and C) may be performed in the presence of catalysts known for accelerating the isocyanate addition reaction. These catalysts are used, if at all, in amounts of 0.01 to 2.5 wt. %, based on the total weight of the reaction mixture. Suitable catalysts include dibutyltin oxide, dibutyltin dilaurate and triethylamine.

The reaction is generally performed in solvents which are inert towards isocyanate groups under the reaction conditions at a solids content of 50 to 98, preferably 70 to 95 wt. %. Suitable solvents include acetone, dimethyl glycol, N-methylpyrrolidone, N-methyl-caprolactam, ethylglycol acetate and mixtures of these water-dilutable solvents with other solvents such as n-butyl acetate, methoxypropyl acetate, xylene and toluene.

In one embodiment of the process according to the invention, components A) and B) and optionally a solvent are homogenized, component C) is then added at 50° to 120° C. over a period of 1 minute to 2 hours and the reaction is stirred at 80° to 140° C., utilizing the exothermic reaction, until the content of free isocyanate groups has fallen below a value of 0.1%, based on the weight of the reaction mixture. If especially high demands are placed on the residual amount of organic solvent, then some or the entire amount of solvent may be removed from the reaction mixture before, during and/or after neutralization or dispersion of the resin in water. Solvent removal may be carried azeotropically and/or by applying a vacuum or a strong current of inert gas.

The type and amounts of starting components A) to C) are selected such that the resulting products have a weight average molecular weight ($M_w$, determined by gel permeation chromatography using polystyrene as the standard), of 100 to 70,000, preferably 1600 to 45,000; an acid number of 10 to 100, preferably 14 to 60 mg KOH/g; a hydroxyl number of 1 to 170, preferably 14 to 170 mg; and a concentration of olefinic double bonds (calculated as C=C, molecular weight=24) incorporated via component B1) of 0.1 to 15%, preferably 0.25 to 10%.

In view of the hydroxyl number range, it is apparent that a subequivalent quantity of diisocyanate is used with respect to the hydroxyl groups in starting components A) and B). Preferably, the amounts of starting components A) to C) correspond to an NCO/OH equivalent ratio of 0.05:1 to 0.8:1, more preferably 0.1:1 to 0.6:1.

After reaction of starting compounds A) to C) to form a urethane, small amounts of an isocyanate-reactive organic solvent (such as ethanol, n-propanol, iso-propanol, n-butanol, iso-butanol, tert.-butanol, pentanol, hexanol, octanol, butyl glycol, ethyl glycol, butyl diglycol, ethyl diglycol, methyl diglycol, methoxy propanol) may be added to produce specific properties. These solvents are added, in contrast to components B3) and B4), after completion of the reaction and, thus, only act as solvents.

25 to 100%, preferably 40 to 100% of the carboxyl groups present in the reaction product are converted into carboxylate groups before or during the subsequent dispersion step by adding one or more bases. Suitable bases include ammonia, N-methylmorpholine, triethylamine, dimethylethanolamine, dimethylisopropanolamine, triethanolamine, triisopropylamine, 2-amino-2-methyl-1-propanol and mixtures thereof. Also suitable, but less preferred as neutralizing agents, are sodium hydroxide, lithium hydroxide and potassium hydroxide. Preferred neutralizing agents are ammonia, triethylamine, N-dimethylethanolamine and N-dimethylisopropanolamine.

When using tertiary amines such as triethylamine as neutralizing agents, they may be added before this reaction since they also act as catalysts for the isocyanate addition reaction.

The term "dispersion step" is understood to mean conversion of the organic resin phase into an aqueous solution and/or dispersion. In general, these aqueous systems contain both dissolved and dispersed fractions. In the dispersion step the water/neutralizing agent mixture may be added to the resin; the resin may be added to the water/neutralizing agent mixture; water may be added to the resin/neutralizing agent mixture; or the resin/neutralizing agent mixture may be added to water. The dispersibility of the resin in water may be improved, if desired, by incorporating external, ionic or non-ionic emulsifiers, such as ethoxylated nonylphenol during dispersion. The dispersion step is generally performed at 40° to 120° C.

The solids content of the aqueous binder dispersions is 15 to 65 wt. %, preferably 25 to 55 wt. %. The amount of organic solvents is less than 10 wt. %, preferably less than 7 wt. %.

In the aqueous coating compositions according to the invention, the binder according to the invention is present as an essential constituent. In addition to the binders according to the invention, other oxidatively drying lacquer resins and/or lacquer resins cross-linkable with the cross-linking resins to be described hereinafter. These other lacquer resins may be present in an amount, based on the solids content of the binders according to the invention, of up to 50, preferably up to 25 wt. %.

The aqueous coating compositions containing the aqueous binders according to the invention may readily be used as room temperature oxidatively drying aqueous lacquers or coating compositions. These coating compositions preferably also contain the known additives from lacquer technology such as pigments, drying accelerators, skin-prevention agents, thickeners, flow-control agents and anti-foaming agents. Some of these additives may be added, if required, to the reaction mixture during preparation of the aqueous binder if this does not cause problems in the production process. High quality aqueous lacquers and coating compositions which oxidatively dry at room temperature are obtained in this way. They may be applied by known methods such as spraying, flooding, immersing, rolling, spreading, pouring or brushing onto any substrate such as wood, paper, metal, plastic, glass and mineral substrates.

The lacquers dry at room temperature, under forced drying at up to about 80° C. or under stoving conditions, to give clear, cross-linked, glossy coatings.

The binder dispersions according to the invention are also suitable, as polyol components in combination with lacquer polyisocyanates which contain free isocyanate groups (such as those described in U.S. Pat. No. 5,075,370, herein incorporated by reference) in aqueous two-component coating systems or, when combined with blocked lacquer polyisocyanates and/or amino cross-linking agents, as binders in heat-curable coating compositions.

In the following examples, all parts and percentages are by weight unless otherwise indicated.

EXAMPLES

Preparation of Polyacrylate $A_1$ 296.6 g of dipropylene glycol dimethyl ether were introduced into an apparatus provided with a stirrer, thermometer, source of heat and cooling device and heated to 140° C. Over a period of 3 hours, a mixture of 156.0 g of n-butyl acrylate, 72.0 g of t-butyl methacrylate, 876.0 g of methyl methacrylate, 24.0 g of hydroxyethyl methacrylate, 72.0 g of acrylic acid and 12.0 g of n-dodecyl mercaptan was added. Beginning at the same time 51.4 g of tert.-butyl per-2-ethylhexanoate (70% solids in a mixture of hydrocarbons) were added over a period of 4 hours. When addition of the peroxide was complete, stirring was continued at 140° C. for 2 hours.

The resulting solvent-containing polyacrylate resin $A_1$ had a solids content of about 80%, an acid number of about 39 mg KOH/g solids and an OH number of about 11 mg KOH/g solids.

Preparation of Polyacrylate $A_2$ 295.9 g of methoxypropyl acetate were introduced into an apparatus provided with a stirrer, thermometer, source of heat and cooling device and heated to 140° C. Over a period of 3 hours, a mixture of 198.0 g of n-butyl acrylate, 72.0 g of iso-butyl methacrylate, 852.0 g of methyl methacrylate, 24.0 g of hydroxyethyl methacrylate, 54.0 g of acrylic acid and 18.0 g of n-dodecyl mercaptan was added. Beginning at the same time 68.6 g of tert.-butyl per-2-ethylhexanoate (70% strength in a mixture of hydrocarbons) were added over a period of 4 hours. When the addition of the peroxide was complete, stirring was continued at 140° C. for 2 hours.

The resulting solvent-containing polyacrylate resin $A_2$ had a solids content of about 80.6%, an acid number of about 38.3 mg KOH/g solids and an OH number of about 11 mg KOH/g solids.

Preparation of Polyester $B_1$ 911 g of phthalic anhydride, 1022 g of isophthalic acid, 3353 g of pentaerythritol, 6900 g of soya oil fatty acid and 1278 g of benzoic acid were introduced into an apparatus provided with a stirrer, thermometer, source of heat and distillation unit and heated to 140° C. over a period of 1 hour. The reaction mixture was then heated to 220° C. over a period of 8 hours and the condensation reaction proceeded at 220° C. with the elimination of water until the discharge viscosity (DIN standard cup 4, 75% solids in xylene) had risen to 90 to 110 seconds.

The resulting product had a discharge viscosity of 101 seconds (DIN standard cup 4, 75% solids in xylene at 23° C.), an acid number of 2.9 mg KOH/g solids and an OH number of 174 mg KOH/g solids.

Preparation of Polyester $B_2$ 2979 g of phthalic anhydride, 5821 g of soy oil fatty acid and 4436 g of trimethylolpropane were introduced into an apparatus provided with a stirrer, thermometer, source of heat and distillation unit and heated to 140° C. over a period of 1 hour. The reaction mixture was then heated to 220° C. over a period of 8 hours and the condensation reaction proceeded at 220° C. with elimination of water until the acid number had fallen to a value of less than 3.0 mg KOH/g solids.

The resulting product had a discharge viscosity of 47 seconds (DIN standard cup 4, 70% solids in xylene at 23° C.), an acid number of 2.6 mg KOH/g solids and an OH number of 163 mg KOH/g solids.

Example 1

(According to the Invention)

187.5 g of polyacrylate $A_1$ and 150.0 g of polyester $B_1$ were introduced into an apparatus provided with a stirrer, thermometer, source of heat and cooling device, heated to 100° C. and homogenized. 18.4 g of hexamethylene diisocyanate were then added over a period of 15 minutes and stirred at 100° C. until the NCO content had fallen to <0.1%. The resin was dispersed in 6.4 g of $NH_3$ (22.6% strength) and 431.5 g of water and, after dispersing, 4.8 g of a skin preventing additive (Ascinin R conc., available from Bayer AG) was added.

The binder dispersion had a solids content of 39.6% and an acid number of about 25 mg KOH/g solids. The concentration of organic co-solvents was about 4.7%. The dispersion did not exhibit any phase separation after storage for 6 months at room temperature.

Example 2

(According to the Invention)

187.5 g of polyacrylate $A_2$ and 150.0 g of polyester $B_2$ were introduced into an apparatus provided with a stirrer, thermometer, source of heat and cooling device, heated to 100° C. and homogenized. 18.4 g of hexamethylene diisocyanate dissolved in 10.1 g of methoxypropyl acetate were then added over a period of 15 minutes and stirred at 100° C. until the NCO content had fallen to <0.1%. The resin was dispersed in 7.7 g of $NH_3$ (22.6% strength) and 417.5 g of water and, after dispersing, 4.8 g of the skin preventing additive from Example 1 was added.

The binder dispersion had a solids content of 39.8% and an acid number of 19.1 mg KOH/g solids. The concentration of organic co-solvents was about 6.9%. The dispersion did not exhibit any phase separation after storage for 6 months at room temperature.

Comparison Example 1

187.5 g of polyacrylate $A_1$ and 150.0 g of polyester $B_1$ were introduced into an apparatus provided with a stirrer, thermometer, source of heat and cooling device, heated to 100° C. and homogenized. The resin was dispersed in 12.0 g of $NH_3$ (22.6% strength) and 590.0 g of water and, after dispersing, 4.5 g of the skin preventing additive from Example 1 was added.

The binder dispersion had a solids content of 35.7% and an acid number of about 25 mg KOH/g solids. The concentration of organic co-solvents was about 3.9%. The dispersion formed two phases after storage for a few days at room temperature.

Comparison Example 2

The composition of the polymer resin in this comparison example, which was prepared in polyester $B_1$) as reaction medium, corresponds to polyacrylate $A_1$. Therefore, this comparison example is directly comparable with example 1.

150 g of polyester $B_1$ and 35.6 g of dipropylene glycol dimethyl ether were introduced into an apparatus provided with a stirrer, thermometer, source of heat and cooling device and heated to 140° C. Over a period of 3 hours a mixture of 18.7 g of n-butyl acrylate, 8.7 g of t-butyl methacrylate, 105.3 g of methyl methacrylate, 2.9 g of hydroxyethyl methacrylate, 8.7 g of acrylic acid and 1.4 g of n-dodecyl mercaptan was added. Beginning at the same time 6.1 g of tert.-butyl per-2-ethylhexanoate (70% solids in a mixture of hydrocarbons) were added over a period of 4 hours. When addition of the peroxide was complete, stirring was continued for 2 hours at 140° C. The resin was dispersed in 6.4 g of $NH_3$ (22.6% strength) and 431.5 g of water and, after dispersing, 4.5 g of the skin preventing additive from Example 1 was added.

The binder dispersion had a solids content of 39.0% and an acid number of about 25 mg KOH/g solids. The concentration of organic co-solvents was about 4.7%. The dispersion did not exhibit any phase separation after storage for 6 months at room temperature.

Testing as a clear lacquer:

100.0 g of the particular binder dispersion were mixed with a siccative (Octa Soligen Kobalt 7 aqua, Gebr. Borchers AG) such that the resulting mixture contained 0.06% Co metal, based on the binder resin, and spread in a 180 μm thick layer onto a glass plate. Film comparisons were made after storage for 24 hours and 7 days (at room temperature).

|  | Example 1 | Comparison Example 1 | Comparison Example 2 |
|---|---|---|---|
| Storage stability: (after 7 d) | unchanged | 2 phases formed | unchanged |
| Drying: (touch dry) | 45 minutes | 60 minutes | 50 minutes |
| Appearance: | Clear | Cloudy | Clear |
| Resistance[1]: to petrol[2] after 1d/7d | 3/1 | 4/4 | 5/5 |
| To water[3] (after 1d/7d) | 1/1 | 3/3 | 3/3 |

Notes:
[1]Resistances: 0–5, 0 = unchanged, 5 = substantial change
[2]Using standard test fuel according to technical committee for the Mineral Oil and Fuel Standard (DIN 51604, part I), contact time - 1 minute
[3]Contact time - 5 hours Comparison example 1 demonstrates that reaction of the polyester and polyacrylate components with a diisocyanate was required in order to achieve storage stable dispersions and better compatibility (clear films). Comparison example 2 demonstrates that the reactivity of the unsaturated fatty acids was reduced by radical polymerization of the (meth) acrylate monomers in the presence of polyesters which contain fatty acids, resulting in poorer stability characteristics for the dried films.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing an aqueous binder for aqueous coating compositions which comprises reacting a mixture of A) 9.9 to 85 wt. % of a hydroxy- and acid-functional poly(meth)acrylate and B) 14.9 to 90 wt. % of a hydroxy-functional polyester wherein a portion of the acid component used to prepare the polyester is an unsaturated fatty acid capable of oxidative drying with C) 0.1 to 20 wt. % of a diisocyanate having a molecular weight of 140 to 318, to form urethane groups and then dissolving or dispersing the reaction product in water with prior or simultaneous neutralization of at least a portion of the carboxyl groups present, wherein the sum of the percentages of A) to C) add up to 100.

2. An aqueous binder for aqueous coating compositions which comprises the urethane group-containing reaction product of A) 9.9 to 85 wt. % of a hydroxy- and acid-functional poly(meth)acrylate and B) 14.9 to 90 wt. % of a hydroxy-functional polyester wherein a portion of the acid component used to prepare the polyester is an unsaturated fatty acid capable of oxidative drying with C) 0.1 to 20 wt. % of a diisocyanate having a molecular weight of 140 to 318, wherein the sum of the percentages of A) to C) add up to 100 and wherein at least a portion of the carboxyl groups are present in neutralized form.

3. The binder of claim 2 wherein component A) is the reaction product of

A1) 1 to 99 wt. % of one or more $\alpha,\beta$-unsaturated mono and/or dicarboxylic acids having 3 to 16 carbon atoms, A2) 0.1 to 30 wt. % of one or more hydroxyalkyl esters of (meth)acrylic acid wherein the hydroxyalkyl groups have 2 to 12 carbon atoms and optionally contain ether groups, A3) 0 to 98 wt. % of one or more (cyclo)alkyl esters of (meth)acrylic acid having 1 to 20 carbon atoms in the (cyclo)alkyl group and A4) 0 to 80 wt. % of one or more copolymerizable compounds other than A1) to A3), wherein the sum of the percentages of A1) to A4) add up to 100.

4. The binder of claim 2 wherein component A) is the reaction product of

A1) 1 to 50 wt. % of one or more $\alpha,\beta$-unsaturated mono and/or dicarboxylic acids having 3 to 16 carbon atoms, A2) 0.1 to 20 wt. % of one or more hydroxyalkyl esters of (meth)acrylic acid wherein the hydroxyalkyl groups have 2 to 12 carbon atoms and optionally contain ether groups, A3) 15 to 98 wt. % of one or more (cyclo)alkyl esters of (meth)acrylic acid having 1 to 20 carbon atoms in the (cyclo)alkyl group and A4) 0 to 65 wt. % of one or more copolymerizable compounds other than A1) to A3), wherein the sum of the percentages of A1) to A4) add up to 100.

5. The binder of claim 2 wherein component A) is the reaction product of

A1) 1.5 to 25 wt. % of one or more $\alpha,\beta$-unsaturated mono and/or dicarboxylic acids having 3 to 16 carbon atoms, A2) 0.5 to 10 wt. % of one or more hydroxyalkyl esters of (meth)acrylic acid wherein the hydroxyalkyl groups have 2 to 12 carbon atoms and optionally contain ether groups, A3) 30 to 95 wt. % of one or more (cyclo)alkyl esters of (meth)acrylic acid having 1 to 20 carbon atoms in the (cyclo)alkyl group and A4) 0 to 50 wt. % of one or more copolymerizable compounds other than A1) to A3), wherein the sum of the percentages of A1) to A4) add up to 100.

6. The binder of claim 2 wherein component B) is the reaction product of

B1) 15 to 90 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 7 to 60 wt. % of a polycarboxylic acid component containing one or more di-, tri- or tetracarboxylic acids having a molecular weight of 98 to 840 and/or their anhydrides, B3) 10 to 60 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

7. The binder of claim 3 wherein component B) is the reaction product of

B1) 15 to 90 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 7 to 60 wt. % of a polycarboxylic acid component containing one or more di-, tri- or tetracarboxylic acids having a molecular weight of 98 to 840 and/or their anhydrides, B3) 10 to 60 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

8. The binder of claim 2 wherein component B) is the reaction product of

B1) 25 to 75 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 10 to 40 wt. % of a polycarboxylic acid component containing one or more di-, tri- or tetracarboxylic acids having a molecular weight of 98 to 840 and/or their anhydrides, B3) 15 to 45 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

9. The binder of claim 4 wherein component B) is the reaction product of

B1) 25 to 75 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 10 to 40 wt. % of a polycarboxylic acid component containing one or more di-, tri- or tetracarboxylic acids having a molecular weight of 98 to 840 and/or their anhydrides, B3) 15 to 45 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

10. The binder of claim 2 wherein component B) is the reaction product of

B1) 35 to 65 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 13 to 30 wt. % of a polycarboxylic acid component containing one or more di-, tri- or tetracarboxylic acids having a molecular weight of 98 to 840 and/or their anhydrides, B3) 20 to 40 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

11. The binder of claim 5 wherein component B) is the reaction product of

B1) 35 to 65 wt. % of a monocarboxylic acid component containing one or more monocarboxylic acids having a molecular weight of 122 to 340, wherein at least 60 wt. % of component B1) is based on one or more unsaturated fatty acids capable of oxidative drying, B2) 13 to 30 wt. % of a polycarboxylic acid component containing one or more di-, tri- or tetracarboxylic acids having a molecular weight of 98 to 840 and/or their anhydrides, B3) 20 to 40 wt. % of a polyol component containing one or more at least dihydric alcohols which have a molecular weight of 62 to 400 and do not contain carboxyl groups and B4) 0 to 30 wt. % of hydroxyl group-containing compounds other than B3), wherein the sum of the percentages of B1) to B4) add up to 100.

12. A one- or two-component, air-drying and/or heat-drying coating composition wherein the binder comprises an aqueous binder containing the urethane group-containing reaction product of A) 9.9 to 85 wt. % of a hydroxy- and acid-functional poly(meth)acrylate and B) 14.9 to 90 wt. % of a hydroxy-functional, fatty acid-modified polyester with C) 0.1 to 20 wt. % of a diisocyanate having a molecular weight of 140 to 318, wherein the sum of the percentages of A) to C) add up to 100 and wherein at least a portion of the carboxyl groups are present in neutralized form, said binder optionally being present in combination with other oxidatively drying lacquer binders.

13. The coating composition of claim 12, which is a two-component coating composition, wherein the binder additionally contains an organic polyisocyanate having free isocyanate groups.

14. The coating composition of claim 12, which is a one-component, heat-drying coating composition, wherein the binder additionally contains a blocked polyisocyanate and/or amino cross-linking agent.

* * * * *